United States Patent
Cox

(12) 
(10) Patent No.: US 6,498,843 B1
(45) Date of Patent: Dec. 24, 2002

(54) METHOD AND SYSTEM FOR INTERCEPTING AND MONITORING SIGNALS IN A NETWORK

(75) Inventor: David L Cox, Bucharest (RO)

(73) Assignee: General Dynamics Government Systems Corporation, Mountain View, CA (US)

(*) Notice: Subject to any disclaimer, the term of this patent is extended or adjusted under 35 U.S.C. 154(b) by 0 days.

(21) Appl. No.: 09/295,425

(22) Filed: Apr. 20, 1999

Related U.S. Application Data

(60) Provisional application No. 60/082,620, filed on Apr. 22, 1998.

(51) Int. Cl.[7] .......................... H04M 3/22; H04M 3/42; H04M 7/00
(52) U.S. Cl. .............................. 379/207.02; 379/32.01; 379/32.03; 379/32.04; 379/35; 379/221.08
(58) Field of Search .......................... 379/34, 35, 207, 379/219, 220, 221, 229, 230, 32.01, 32.02, 32.03, 32.04, 201.01, 221.01, 221.08, 221.09, 221.1, 221.12, 207.02

(56) References Cited

U.S. PATENT DOCUMENTS

| | | | |
|---|---|---|---|
| 5,590,171 A | | 12/1996 | Howe et al. .................. 379/33 |
| 5,881,132 A | * | 3/1999 | O'Brien et al. ................ 379/35 |
| 5,923,744 A | * | 7/1999 | Cheng ....................... 379/35 X |
| 6,097,798 A | * | 8/2000 | Albers et al. ............. 379/35 X |
| 6,229,887 B1 | * | 5/2001 | Albers et al. ............. 379/35 X |
| 6,233,313 B1 | * | 5/2001 | Farris et al. .............. 379/35 X |

OTHER PUBLICATIONS

Service Switching Points (SSPs) Generic Requirements, Bell Communications Research, Technical Reference TR–TSY–000024, Issue Oct. 1, 1985.

* cited by examiner

*Primary Examiner*—Harry S. Hong
(74) *Attorney, Agent, or Firm*—Jenner & Block, LLC

(57) ABSTRACT

Methods and systems consistent with the present invention intercept and monitor signals of any type associated with a target telephone number in a communications network such that the interception and the monitoring are undetectable. Such methods and systems configure a network by provisioning a route to a collection node in the network, defining a first trigger for intercepting a signal associated with the target telephone number, and by defining a second trigger for routing the intercepted signal on the provisioned route to the collection node. The methods and systems then monitor the signal at the collection node by intercepting the signal based on the first trigger and routing the intercepted signal to the collection node based on the second trigger.

61 Claims, 8 Drawing Sheets

METHOD AND SYSTEM FOR INTERCEPTING AND MONITORING SIGNALS IN A NETWORK

CROSS-REFERENCE TO RELATED APPLICATIONS

This application claims the benefit of U.S. Provisional Application No. 60/082,620, filed Apr. 22, 1998, the content of which is hereby incorporated in its entirety by reference.

BACKGROUND OF THE INVENTION

1. Field of the Invention

The present invention generally relates to intercepting and monitoring signals of any type in a communications network, and more particularly, to wiretapping signals of any type in a communications network.

2. Background of the Art

Telecommunication service providers are required under the federal and state law to assist law enforcement personnel in conducting court authorized electronic surveillance (or wiretapping) of target telephone numbers. Electronic surveillance of a target telephone number generally requires intercepting and monitoring signals associated with a target telephone number.

There are three known methods for conducting electronic surveillance of a target telephone number. The first method uses an analog bridge tap, which includes a wire extending from a local loop concentrator box that terminates the loop associated with the target telephone number. The wire connects to a listening device from which signals associated with incoming and outgoing calls directed to the target telephone number are monitored by law enforcement personnel. However, because the wire and the listening device introduce a significant amount of noise into the monitored signal, the analog bridge tap is generally detectable, and thus, is not an effective means for covert electronic surveillance.

The second method uses a loop extension to extend the loop associated with the target telephone number from a local concentrator box to another location such as, a covert government safe-house, which may be remote from the concentrator box. The loop extension extends from the local concentrator box to the safe-house and loops back to the controlling switching office for the target telephone number. At the safe-house, law enforcement personnel monitor signals associated with the target telephone number through a listening device. Like an analog bridge tap, the loop extension is also detectable because the loop and the listening device introduce significant amount of noise into the monitored signal. In addition, because the monitored signal has to travel the entire length of the loop extension, the loop extension may reduce the power of the monitored signal, and thus, may degrade the service provided to the target telephone number, increasing the likelihood of detection.

The third method intercepts and monitors signals associated with a target telephone number by using a monitoring port at a controlling switching office. Typically, law enforcement personnel use a listening device to monitor the intercepted signals at the controlling switching office or from a remote listening post. This method, however, has the disadvantage that the law enforcement personnel may not be able to exercise control over the controlling switching office during the entire duration of a surveillance, requiring the personnel at the controlling switching office to become a de facto agent of the law enforcement personnel.

Thus, it is desirable to have a method and system for monitoring and intercepting signals of any type in a network without the above-mentioned and other disadvantages of the prior art.

SUMMARY OF THE INVENTION

Methods and systems consistent with the present invention intercept and monitor signals of any type in a communications network such that the interception and the monitoring are undetectable. Such methods and systems may intercept and monitor a signal based on one or more items of information such as, a target telephone number, a credit card number, a virtual private network number (VPN), personal identification number (PIN), a prepaid card number, or a third party billing number associated with the signal.

Such methods and systems configure a communications network by provisioning a route to a collection node in the network, defining a first trigger for intercepting a signal associated with a target telephone number, and by defining a second trigger for routing the intercepted signal on the provisioned route to the collection node. The methods and systems then monitor the signal at the collection node by intercepting the signal based on the first trigger and routing the intercepted signal to the collection node based on the second trigger.

In one embodiment, such methods and systems provision a route between one or more switching nodes and a collection node in a communications network, define in the switching nodes a first set of triggers for detecting the signals, and define in a signaling node a second set of triggers for routing the detected signals on the provisioned route to the collection node. The communications network may be any type of network such as, a telecommunications network, a data network (e.g., Transmission Control Protocol/Internet Protocol) capable of supporting voice over Internet Protocol (IP), etc.

When a switching node detects a signal associated with a target telephone number, the switching node identifies a first predefined trigger associated with the target telephone number. The switching node executes the first predefined trigger, which identifies a call treatment tag for routing the detected signal. The switching node then sends via out-of-band signaling or in-band signaling the identified call treatment tag to the signaling node.

Based on the identified call treatment tag, the signaling node identifies a second predefined trigger. The signaling node then executes the second predefined trigger, which routes the detected signal on the provisioned route to the next switching node. Accordingly, for each call treatment tag that the signaling node receives, it executes a corresponding second predefined trigger, which routes the signal on the provisioned route to the next switching node.

After the signaling node routes the signal on the provisioned route to the collection node, the signaling node performs normal call routing steps to route the signal to a destination node. When the setup phase for the signal is completed, law enforcement personnel may monitor the contents of the signal at the collection node. When the detected signal terminates, the switching nodes and the signaling node perform normal call termination steps.

In another embodiment, methods and systems consistent with the present invention intercept and monitor signals of any type in a communications network by provisioning in a switching node a virtual loopback route that links an incoming port to a monitoring port in the switching node, defining in the switching node a first trigger for detecting the signals, and defining in a signaling node a second trigger for routing the detected signals through the provisioned route to a destination node in the network.

When the switching node detects a signal associated with a target telephone number, the switching node identifies the first predefined trigger associated with the target telephone number. The switching node executes the first predefined trigger, which identifies a call treatment tag for routing the detected signal. The switching node then sends via out-of-band signaling or in-band signaling the identified call treatment tag to the signaling node.

Based on the identified call treatment tag, the signaling node identifies a second predefined trigger. The signaling node then executes the second predefined trigger, which routes the detected signal on the virtual loopback route to the monitoring port.

After the signaling node routes the signal on the virtual loopback route to the monitoring port, the signaling node performs normal call routing steps to route the signal to a destination node. When the setup phase of the signal is completed, law enforcement personnel may monitor the contents of the signal at the monitoring port. When the detected signal terminates, the switching nodes and the signaling node perform normal call termination steps.

BRIEF DESCRIPTION OF THE DRAWINGS

The above summary and the following description of the invention should not restrict the scope of the claimed invention. Both provide examples and explanations to enable others to practice the invention. The accompanying drawings, which form part of the description of the invention, show several embodiments of the invention, and together with the description, explain the principles of the invention.

In the Figures.

DETAILED DESCRIPTION

The following description refers to the accompanying drawings. Where appropriate, the same reference numbers in different drawings refer to the same or similar elements.

Methods and systems consistent with the present invention intercept and monitor signals of any type associated with a target telephone number in a communications network such that the interception and the monitoring are undetectable. Such methods and systems provision a route between one or more switching nodes and a collection node in the network, define in the switching nodes a first set of triggers for detecting the signals, and define in a signaling node a second set of triggers for routing the detected signals through the provisioned route to a destination node in the network.

When a switching node detects a signal associated with a target telephone number, the switching node identifies a first predefined trigger associated with the target telephone number. The switching node executes the first predefined trigger, which identifies a call treatment tag for routing the detected signal. The switching node then sends via out-of-band or in-band signaling the identified call treatment tag to the signaling node.

Based on the identified call treatment tag, the signaling node identifies a second predefined trigger. The signaling node then executes the second predefined trigger, which routes the detected signal on the provisioned route to the next switching node. Accordingly, for each call treatment tag that the signaling node receives, it executes a corresponding second predefined trigger, which routes the signal on the provisioned route to the next switching node.

After the signaling transfer routes the signal on the provisioned route to the collection node, the signaling node performs normal call routing steps to route the signal to a destination node. When the setup phase for the signal is completed, law enforcement personnel may monitor the contents of the signal at the collection node. When the detected signal terminates, the switching nodes and the signaling node perform normal call termination steps.

Figure 1:
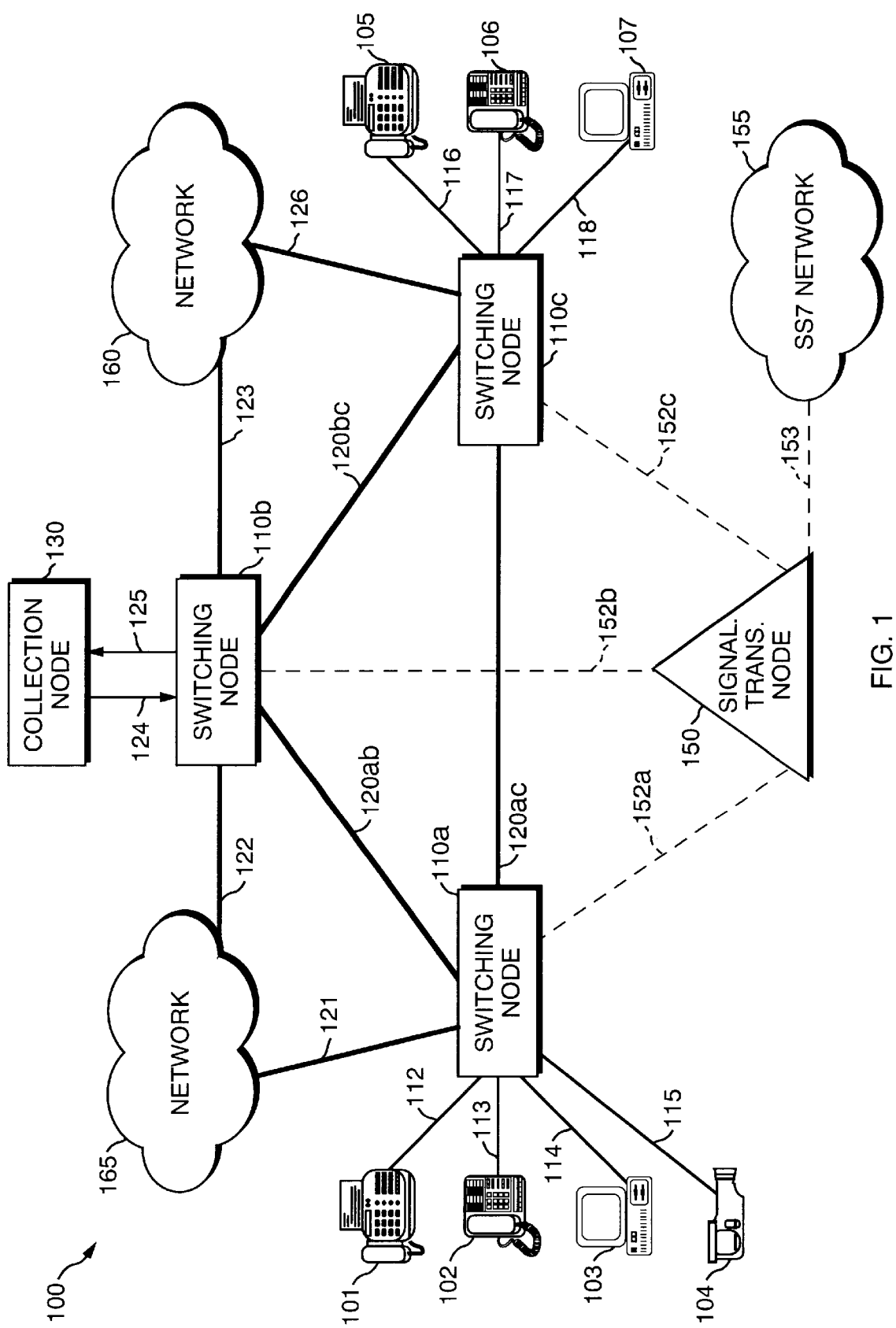
FIG. 1 illustrates a communications network for monitoring signals associated with a telephone number at a collection node, which is connected to a tandem switching node, in accordance with an embodiment of the invention.

FIG. 1 illustrates a communications network 100 for monitoring signals associated with a telephone number at a collection node 130, which is connected to a tandem switching node 110b, in accordance with an embodiment of the invention. Communications network 100 comprises switching nodes 110a, 110b, and 110c, signaling transfer node (STP) 150, and collection node 130. Communications network 100 interfaces external networks 165 and 160 via message links 121, 122, 123, and 126, respectively, and interfaces Signaling System 7 (SS7) network 155 via signaling link 153.

Switching nodes 110a, 110b, and 110c are interconnected via message links 120ab, 120bc, and 120ac, respectively, and interface signaling transfer node 150 via signaling links 152a, 152b, and 152c, respectively. Each of switching nodes 110a, 110b, and 110c may, for example, include a switching system, digital loop concentrator, and remote switching system. For example, switching nodes 110a, 110b, and 110c may each include a 5ESS 2000™ or DMS-1000™ switching systems, which are manufactured by Lucent Technologies and Nortel Telecom, Ltd., respectively.

Switching node 110a is a controlling node for fax machine 101, telephone 102, desktop computer 103, and video transmitter/receiver 104, all of which interface switching node 110a via loops 112–115, respectively. Switching node 110b is a tandem node, and interfaces collection node 130 via links 124 and 125. Switching node 110c is a controlling node for fax machine 105, telephone 106, and desktop computer 107, all of which interface switching node 110c via loops 116–118, respectively.

Each of user devices 101–107 can initiate or receive calls associated with a calling telephone number and a called telephone number, each of which may represent any logical or physical address in communications network 100. Desktop computers 103 and 107 are each capable of generating signals, which may include data, fax, voice, video, and images.

Signaling transfer node (STP) 150 routes the calls through communications network 100 by communicating with switching nodes 110a, 110b, and/or 110c using, for example, SS7 protocol as defined in International Telecommunications Union—Telecommunications Standardization Sector (ITU-TS) documents Q.701 through Q.741, all of which are incorporated herein by reference. A call (herein referred to as a signal) may include any collection of information, for example, voice, data, and video in analog or digital format regardless of protocol and encoding method.

Collection node 130 interfaces with tandem switching node 110b via links 124 and 125, which are provisioned in a loopback configuration. Collection node 130 may include, for example, a digital cross-connect system (DCS), which is capable of operating in monitor mode. In one embodiment, the DCS may be a TITAN 5500™ manufactured by Tellabs. Alternatively, collection node 130 may include any device capable of replicating a signal on link 124 without destroying the integrity of the signal.

Figure 2:
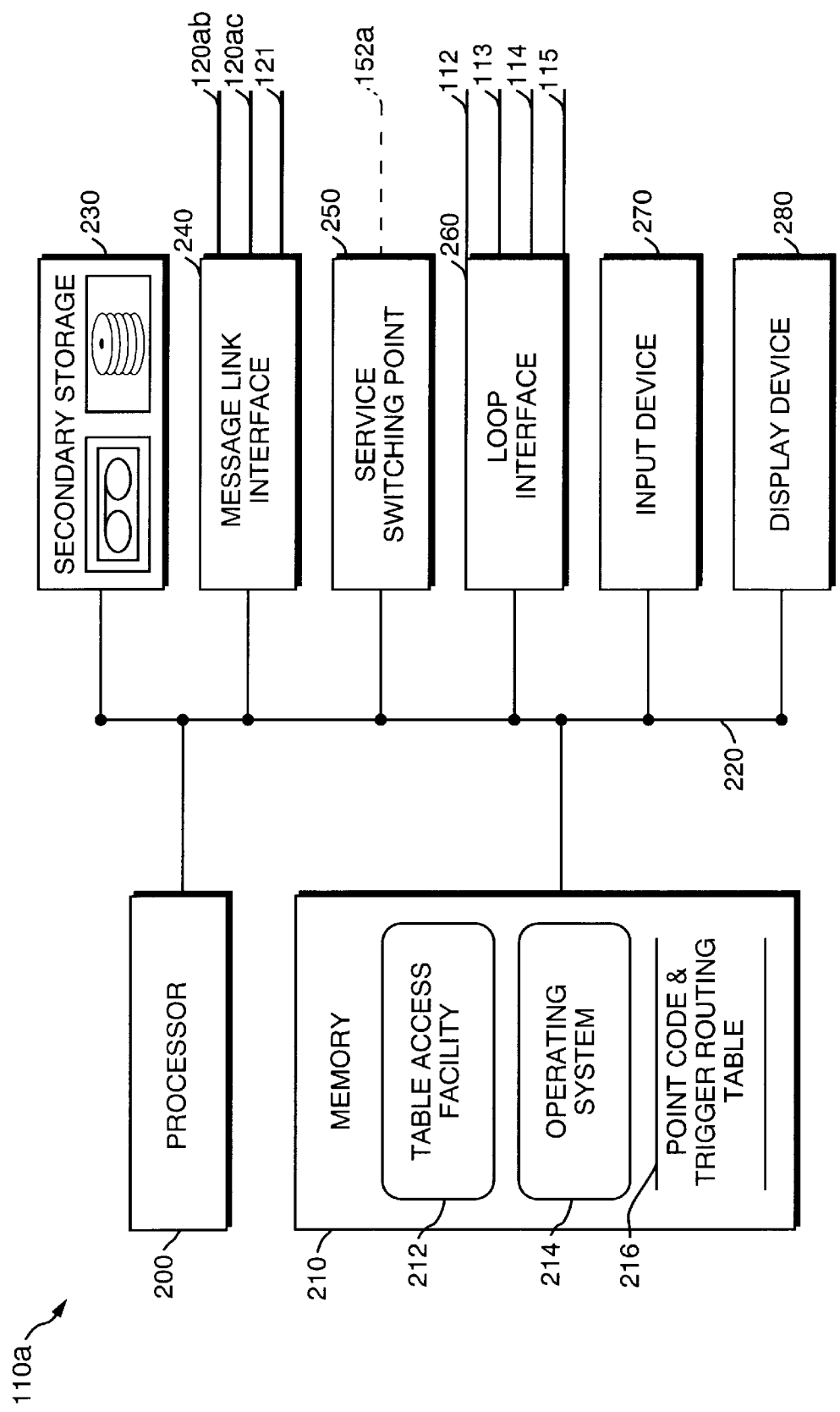
FIG. 2 shows a block diagram of a controlling switching node, in accordance with an embodiment of the invention.

FIG. 2 shows a block diagram of switching node 110a, in accordance with an embodiment of the invention. Switching node 110a comprises processor 200 connected via bus 220 to memory 210, secondary storage 230, message link interface 240, service switching point (SSP) 250, loop interface 260, input device 270, and display device 280.

Memory 210 includes table access facility 212, operating system 214, and point code and trigger routing table 216 (trigger table), each of which includes instructions in form of software that processor 200 executes. Table access facility 212 provides access to trigger table 216 for modifying, deleting, inserting, and/or reading the entries in trigger table 216. For example, an operator may insert new entries or modify existing entries via table access facility 212.

Each entry in trigger table 216 defines a trigger, which includes a key field and an action field. A key field may include, for example, a target telephone number. An action field includes instructions for associating a detected signal with a call treatment tag and sending the call treatment tag to STP 150. In addition, an action field may include instructions for detecting any change in status of a detected signal, for example, addition of a third party to a call in progress, suspension of a call, and/or change in billing attributes of the target telephone number. Also, an action field may include instructions for detecting any change in service features associated with a target telephone number, which may include, for example, changes associated with the transporting of a signal (e.g, encoding of the signal) or service priority of a signal associated with the target telephone number.

Secondary storage 230 comprises a computer readable medium such as a disk drive and a tape drive. From the tape drive, software and data may be loaded onto the disk drive, which can then be copied into memory 210. Similarly, software and data in memory 210 may be copied onto the disk drive, which can then be loaded onto the tape drive.

Message link interface 240 interfaces with message links 120ab, 120ac, and 121, which connect to switching nodes 110b, 110c, and network 165, respectively. Loop interface 260 interfaces with loops 112–115, which connect to devices 101–104, respectively. Input device 270 and display device 280 may, for example, include a keyboard and a video monitor, respectively.

SSP 250 converts signaling information from operating system 214 into SS7 messages for transmission to STP 150 via signaling link 152a and vice versa. For example, SSP 250 may convert the signaling information according to Bellcore publication TR-TSY-000024, "Service Switching Points (SSPs) Generic Requirements," which is incorporated herein by reference.

Figure 3:
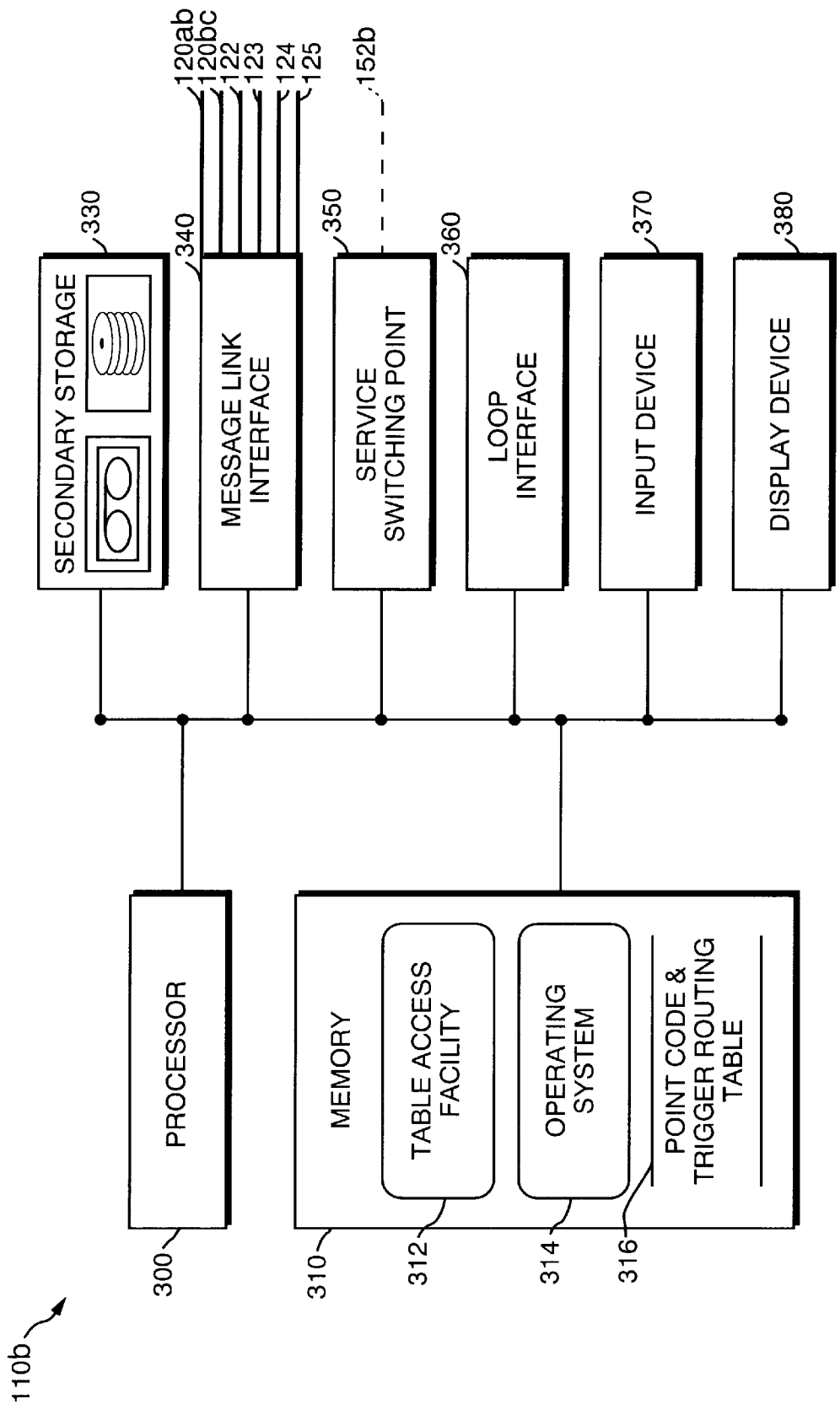
FIG. 3 shows a block diagram of a tandem switching node, in accordance with an embodiment of the invention.

FIG. 3 shows a block diagram of switching node 110b, in accordance with an embodiment of the invention. Switching node 110b comprises processor 300 connected via bus 320 to memory 310, secondary storage 330, message link interface 340, service switching point (SSP) 350, loop interface 360, input device 370, and display device 380.

Memory 310 includes table access facility 312, operating system 314, and point code and trigger routing table 316 (trigger table), each of which includes instructions in form of software that processor 300 executes. Table access facility 312 provides access to trigger table 316 for modifying, deleting, inserting, and reading the entries in trigger table 316. For example, an operator may insert new entries or modify existing entries via input device 370.

Each entry in trigger table 316 represents a trigger, which includes a key field and an action field. A key field includes, for example, a target telephone number. An action field includes instructions for associating a detected signal with a call treatment tag and sending the call treatment tag to STP 150. In addition, an action field may include instructions for detecting any change associated with the status of a detected signal, for example, addition of a third party to a call in progress, suspension of a call, or change in billing attributes of the target telephone number. Also, an action field may include instructions for detecting any change in service features associated with the target telephone number, which may include, for example, changes associated with the transporting of a signal (e.g., encoding of the signal) or service priority of a signal associated with the target telephone number.

Secondary storage 330 comprises a computer readable medium such as a disk drive and a tape drive. From the tape drive, software and data may be loaded onto the disk drive, which can then be copied into memory 310. Similarly, software and data in memory 310 may be copied onto the disk drive, which can then be loaded onto the tape drive.

Message link interface 340 interfaces with message links 120ab, 120bc, 122, 123, 124, and 125, which connect to switching nodes 110a, 110c, networks 165, 160, and collection node 130, respectively. Input device 370 and display device 380 may, for example, include a keyboard and a video monitor, respectively.

SSP 350 converts signaling information from operating system 314 into SS7 messages for transmission to STP 150 via signaling link 152b and vice versa. For example, SSP 350 may convert the signaling information according to Bellcore publication TR-TSY-000024, "Service Switching Points (SSPs) Generic Requirements."

Figure 4:
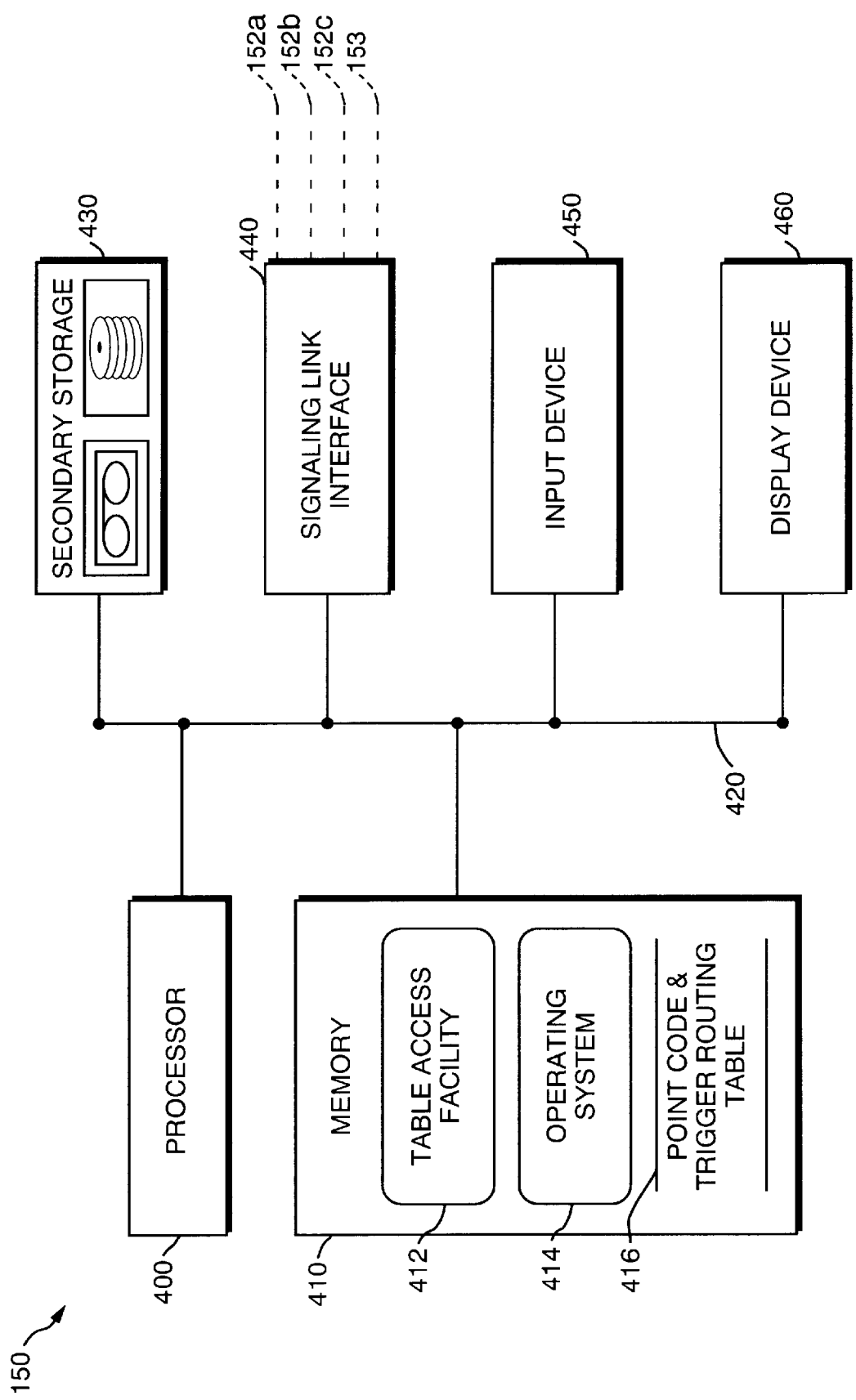
FIG. 4 shows a block diagram of a signaling node, in accordance with an embodiment of the invention.

FIG. 4 shows a block diagram of STP 150, in accordance with an embodiment of the invention. STP 150 comprises processor 400 connected via bus 420 to memory 410, secondary storage 430, signaling link interface 440, input device 450, and display device 460.

Memory 410 includes table access facility 412, operating system 414, and point code and trigger routing table 416 (trigger table), each of which includes instructions in form of software that processor 400 executes. Table access facility 412 provides access to trigger table 416 for modification, deletion, insertion, and reading of entries in trigger table 316. For example, an operator may insert new entries or modify existing entries via input device 450. Each entry in trigger table 416 represents a trigger, which includes a key field and an action field. A key field includes, for example, a call treatment tag. An action field includes instructions for routing signals associated with the call treatment tag.

Secondary storage 430 comprises a computer readable medium such as a disk drive and a tape drive. From the tape drive, software and data may be loaded onto the disk drive, which can then be copied into memory 410. Similarly, software and data in memory 410 may be copied onto the disk drive, which can then be loaded onto the tape drive.

Signaling link interface 440 interfaces with signaling links 152a, 152b, 152c, and 155 for communicating with switching nodes 110a, 110b, 110c, and SS7 network 155, respectively.

Figure 5:
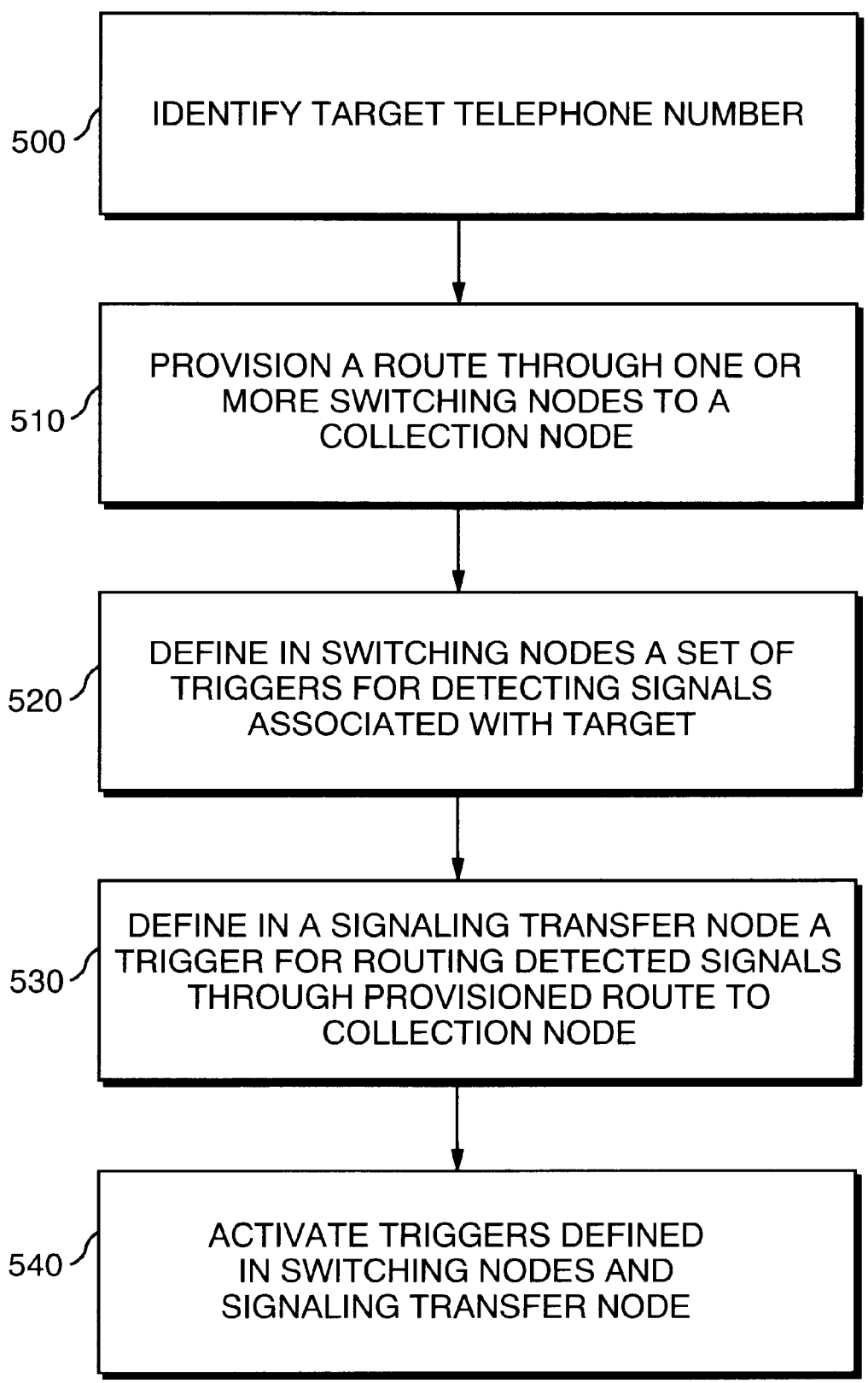
FIG. 5 is a flow chart of the steps for configuring a communications network, in accordance with an embodiment of invention.

FIG. 5 is a flow chart of the steps for configuring communications network 100, in accordance with an embodiment of invention. An operator may identify a target telephone number, for example, the telephone number assigned to telephone 101 shown in FIG. 1, for intercepting and monitoring incoming and outgoing signals associated with the target telephone number (step 500). The operator may be a person or a system located locally at switching nodes 110a and 110b or located remotely at some other location in communication network 100.

Using operating systems 214 and 314 in switching nodes 110a and 110b, respectively, the operator provisions a route, which includes switching nodes 110a, 110b, collection node 130, links 120ab, 124, and 125 (step 510). In provisioning the route, the operator maps physical ports in switching nodes 110a, 110b, collection node 130, and circuits in links 120ab, 124, and 125 to logical name tags. The operator then assigns the logical circuits associated with links 120ab, 124, and 125 to the logical ports associated with switching nodes 110a, 110b, and collection node 130. The portion of the provisioned route that includes links 124 and 125 is configured as a loopback.

Using table access facilities 212 and 312, the operator inserts in trigger tables 216 and 316 of switching nodes 110a and 110b, respectively, triggers for detecting initiation of any signal associated with the target telephone number (step 520). For example, the operator may insert in trigger table 216 a trigger A, which includes a key field and an action field. The key field includes the target telephone number. The action field includes instructions for detecting initiation of any signal associated with the target telephone number, associating the detected signal with a call treatment tag, for example tag "22," and including tag 22 in an SS7 initial address message (IAM), which SSP 250 sends to STP 150.

The IAM message may include, for example, the target telephone number, the called telephone number, date, time, the port number on which the detected signal enters switching node 110a, an identifier associated with switching node 110a, and a flag field that includes tag 22. For example, the IAM message may be an ISDN User Part (ISUP) message, which includes the IAM message information in the form of octets in the signaling information field (SIF) of a message signal unit (MSU) structure.

Similarly, the operator may insert in trigger table 316 a trigger B, which includes a key field and an action field. The key field includes the target telephone number. The action field includes instructions for detecting initiation of any signal associated with the target telephone number, associating the detected signal with a call treatment tag, for example tag "23," and including tag 23 in an IAM message, which SSP 350 sends to STP 150.

The operator inserts in trigger table 416 of STP 150 triggers C and D for routing a detected signal through the provisioned route of step 510 (step 530). The key field in trigger C includes tag 22. The action field in trigger C includes instructions for routing from switching node 110a any signal associated with the target telephone number on link 120ab. The key field in trigger D includes tag 23. The action field in trigger D includes instructions for routing from switching node 110b any signal associated with the target telephone number on the loopback route that includes links 124 and 125. Finally, the operator activates the triggers A, B, C, and D in trigger tables 216, 316, and 416, respectively (step 540).

Figure 6:
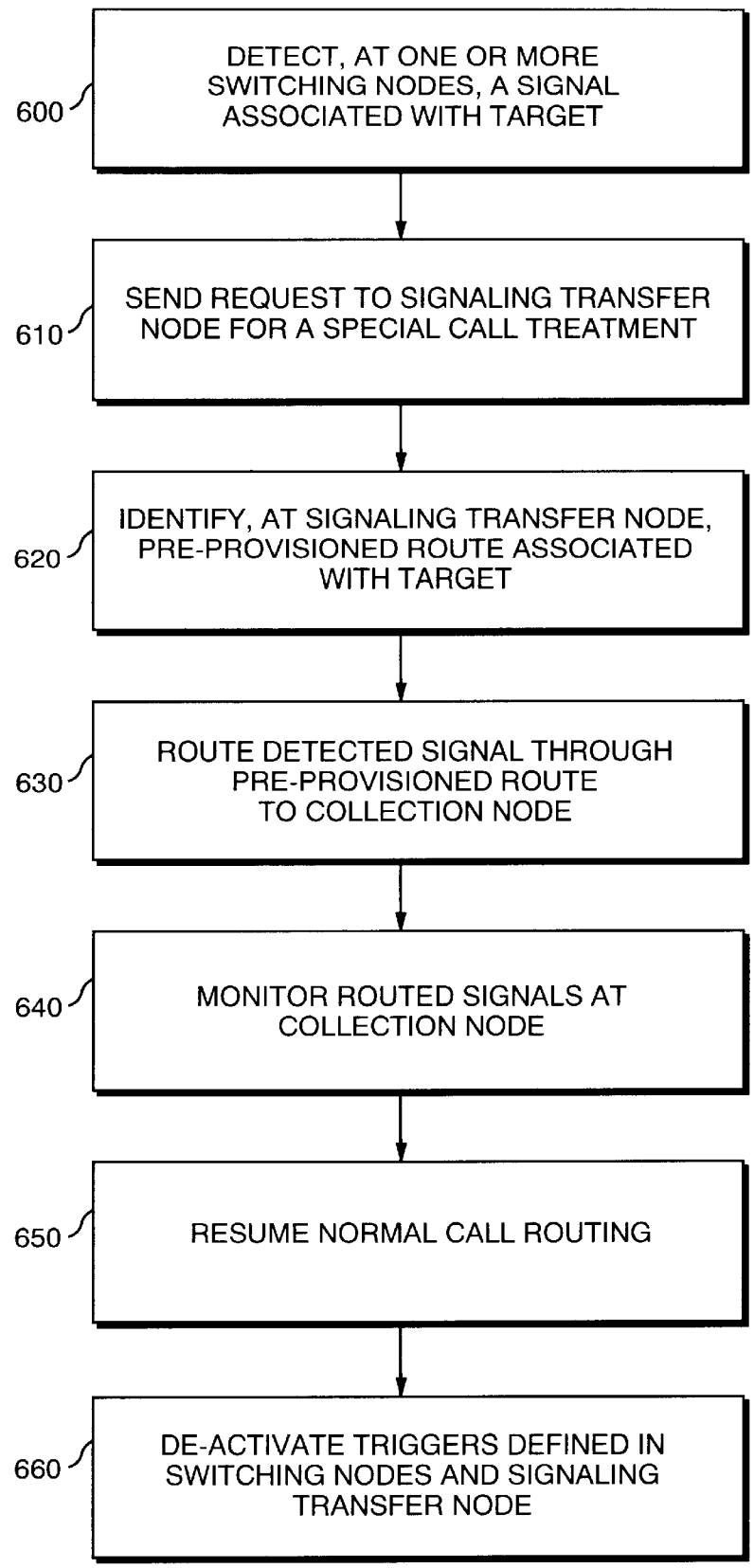
FIG. 6 is a flow chart of the steps for intercepting and monitoring signals associated with a telephone number in a communications network, in accordance with an embodiment of the invention.

FIG. 6 is a flow chart of the steps for intercepting and monitoring signals, in communications network 100 in accordance with an embodiment of the invention. In one embodiment, telephone 101, which is assigned to the target telephone number identified in step 500 of FIG. 5, initiates a signal to a telephone number, which is assigned to, for example, telephone 106 shown in FIG. 1. When switching node 110a detects the signal, operating system 214 identifies the target telephone number associated with the signal (step 600). Operating system 214 uses the target telephone number as a key into trigger table 216 to retrieve and execute trigger A. Trigger A suspends call processing associated with target telephone number, and inserts call treatment tag 22 in the flag field of an IAM message, which SSP 250 sends to STP 150 (step 610).

When STP 150 receives the IAM message from switching node 110a, operating system 414 uses tag 22 as a key into trigger table 416 to retrieve and execute trigger C, which routes the detected signal through link 120ab to switching node 110b (steps 620–630). When the signal arrives at switching node 110b, operating system 314 identifies the target telephone number associated with the signal (step 600). Operating system 314 uses the target telephone number as a key into trigger table 316 to retrieve and execute trigger B. Trigger B suspends call processing associated with target telephone number and inserts tag 23 in, for example, the flag field of an SS7 IAM message, which SSP 350 sends to STP 150 (step 610). When STP 150 receives the IAM message from switching node 110b, operating system 414 uses tag 23 as a key into trigger table 416 to retrieve and execute trigger D, which routes the detected signal through link 124 to collection node 130 (steps 620–630).

When collection node 130 detects the signal, collection node 130 simultaneously replicates the signal and directs the duplicate copy of the signal to a monitoring port in collection node 130 (step 640). The monitoring port may be connected to a speaker, a video display or a digital data capturing device, each of which provides the capability to hear or view the contents of the signal. The monitoring port may be either singular or polar depending on the rate of the signal. For example, if the signal is a 64 kbps Digital Signal-Level 0 (DS0), the monitoring port may include two 64 kbps channels, one for the signal in the east-west direction and the other for the signal in the west-east direction.

After replicating the signal, collection node 130 sends the signal via link 125 to switching node 110b. When switching node 110b detects the signal, normal call routing resumes at switching node 110b (step 650), and STP 150 routes the signal from switching node 110b to switching node 110c, which then directs the signal to telephone 106.

When switching nodes 110a, 110b, 110c, and STP 150 detect that the signal has been terminated, they each perform normal call termination steps. Finally, when monitoring of the target telephone number is completed, the operator de-activates triggers A, B, C, and D (step 660). In addition, the operator may delete triggers A, B, C, and D from their respective trigger tables 216, 316, and 416.

Figure 7:
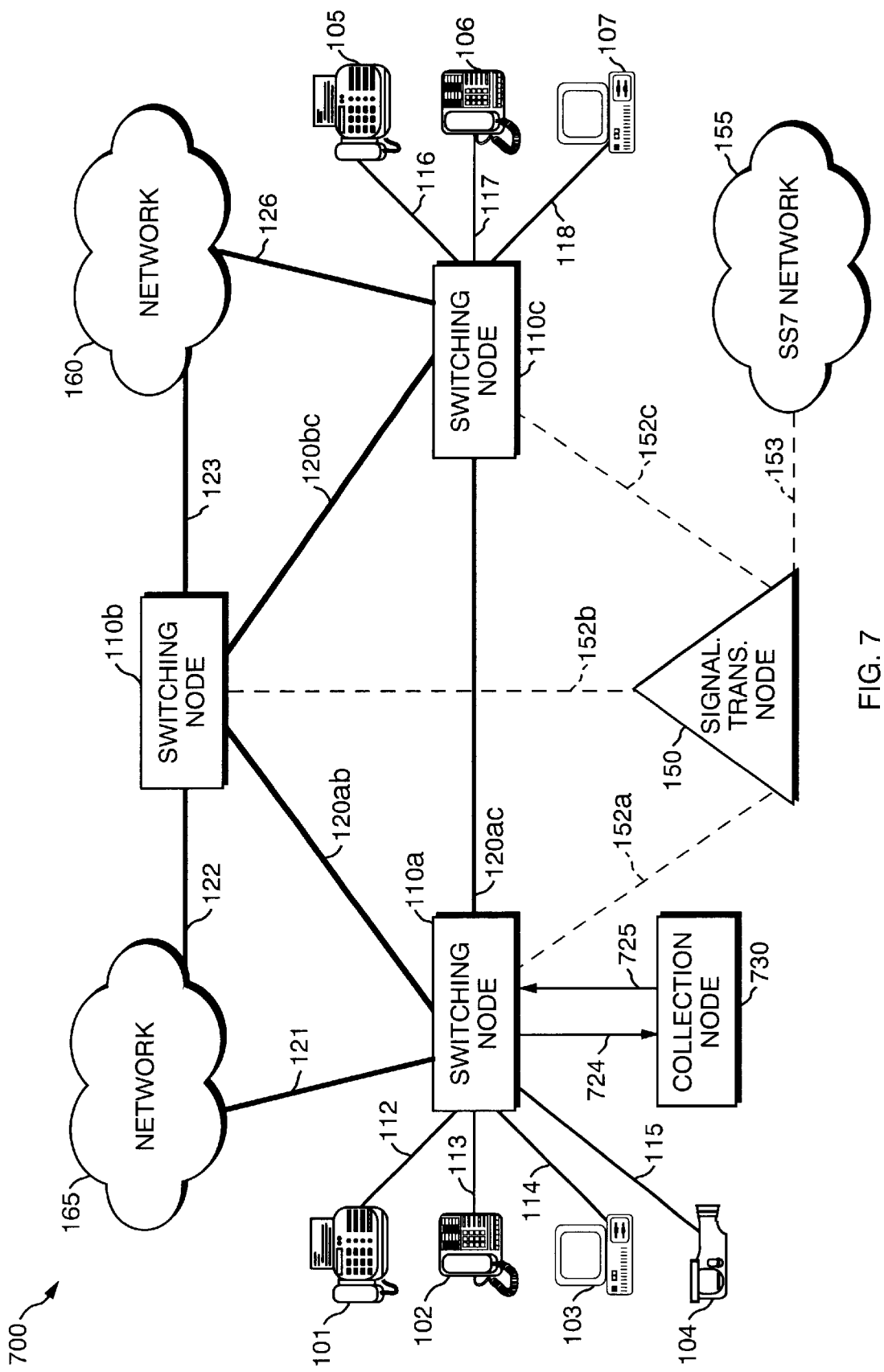
FIG. 7 illustrates a communications network for monitoring at a collection node signals associated with a telephone number, where the collection node interfaces with a controlling switching node, in accordance with an embodiment of the invention.

FIG. 7 illustrates communications network 700 for intercepting and for monitoring at collection node 730 signals associated with a telephone number, where collection node 730 interfaces with controlling switching node 110a, in accordance with an embodiment of the invention. Communications network 700 comprises switching nodes 110a, 110b, and 110c, signaling transfer node (STP) 150, and collection node 130. Communications network 700 interfaces external networks 165 and 160 via message links 121, 122, 123, and 126, and interfaces SS7 network 155 via signaling link 153. Collection node 730 interfaces with controlling switching node 110a via links 724 and 725, which are provisioned in a loopback configuration.

Referring back to the flow chart of FIG. 5, the operator may identify a target telephone number, for example, the telephone number assigned to telephone 101 shown in FIG. 7, for intercepting and monitoring incoming and outgoing signals associated with the target telephone number (step 500). Using operating system 214 in switching nodes 110a, the operator provisions a route, which includes switching nodes 110a, links 724 and 725 (step 510). In provisioning the route, the operator maps physical ports in switching nodes 110a, collection node 750, and circuits in links 724, and 725 to logical name tags. The operator then assigns logical circuits in links 724 and 725 to logical ports in switching nodes 110a and collection node 730. The portion of the provisioned route that includes links 724 and 725 is configured as a loopback.

Using table access facility 212, the operator inserts in trigger table 216 of switching node 110a triggers for detecting initiation of any signal associated with the target telephone number (step 520). For example, the operator may insert in trigger table 216 a trigger A1, which includes a key field and an action field. The key field includes the target telephone number. The action field includes instructions for detecting initiation of any signal associated with the target telephone number, associating the detected signal with a call treatment tag, for example tag "32," and including tag 32 in an SS7 initial address message (IAM), which SSP 250 sends to STP 150.

The IAM message may include, for example, the target telephone number, the called telephone number, date, time, the port number on which the detected signal enters switching node 110a, an identifier associated with switching node 110a, and a flag field that includes tag 32. For example, the IAM message may be an ISDN User Part (ISUP) message, which includes the IAM message information in the form of octets in the signaling information field (SIF) of a message signal unit (MSU) structure.

The operator inserts in trigger table 416 of STP 150 trigger C1 for routing a detected signal through the route, which is provisioned in step 510 (step 530). The key field in trigger C1 includes tag 32. The action field in trigger C1 includes instructions for routing at switching node 110a any signal associated with the target telephone number on the loopback route, which includes links 724 and 725. Finally, the operator activates the triggers A1 and C1 in trigger tables 216 and 416, respectively (step 540).

In one embodiment, telephone 101, which is assigned to the target telephone number identified in step 500, initiates a signal directed to a telephone number, which is assigned to, for example, telephone 106 shown in FIG. 7. As shown in the flow chart of FIG. 6, when the signal arrives at switching node 110a, operating system 214 identifies the target telephone number associated with the signal (step 600). Operating system 214 uses the target telephone number as a key into trigger table 216 to retrieve and execute trigger A1. Trigger A1 suspends call processing associated with target telephone number and inserts tag 32 in the flag field of an IAM message, which SSP 250 sends to STP 150 (step 610).

When STP 150 receives the IAM message from switching node 110a, operating system 414 uses tag 32 as a key into trigger table 416 to retrieve and execute trigger C1, which routes the detected signal through link 724 to collection node 730 (steps 620–630). When collection node 730 receives the signal, collection node 730 simultaneously replicates the signal and directs the duplicate copy of the signal to a monitoring port in collection node 730 (step 640). The monitoring port may be connected to a speaker, a video display, or a digital data capturing device, each of which provides the capability to hear or view the contents of the signal. After the signal is replicated by collection node 730, the signal exits collection node 730 on link 725.

When switching node 110a detects the signal, normal call routing resumes (step 650), and STP 150 routes the signal from switching node 110a to switching node 110c, which then directs the signal to telephone 106.

When switching nodes 110a, 110c, and STP 150 detect that the signal has been terminated, they each perform normal call termination steps. Finally, when monitoring of the target telephone number is completed, the operator de-activates triggers A1 and C1 (step 660). In addition, the operator may delete triggers A1 and C1 from their respective trigger tables 216 and 416.

Figure 8:
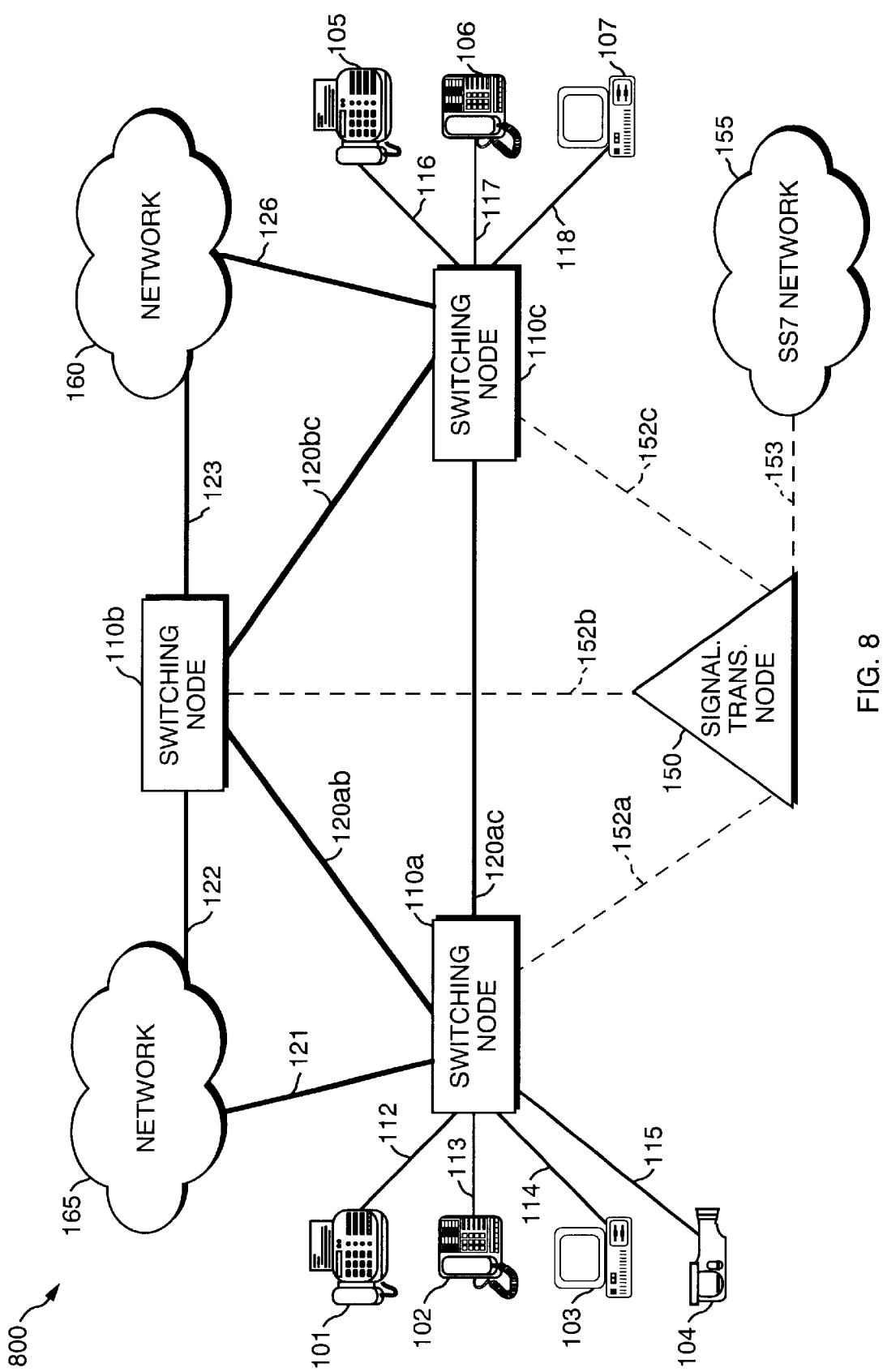
FIG. 8 illustrates a communications network for monitoring signals associated with a telephone number at a controlling switching node, in accordance with an embodiment of the invention.

FIG. 8 illustrates communications network 800 for intercepting and for monitoring at controlling switching node 110a signals associated with a target telephone number, in accordance with an embodiment of the invention. Communications network 800 comprises switching nodes 110a, 110b, and 110c, and signaling transfer node (STP) 150. Communications network 800 interfaces external networks 165 and 160 via message links 121, 122, 123, and 126, and interfaces SS7 network 155 via signaling link 153.

Referring back to the flow chart of FIG. 5, the operator may identify a target telephone number, for example, the telephone number assigned to telephone 101 shown in FIG. 8, for intercepting and monitoring incoming and outgoing signals associated with the target telephone number (step 500). Using operating system 214 in switching nodes 110a, the operator provisions in memory 210 a virtual loopback route (step 510). The virtual loopback route forms an internal link between the incoming port of switching node 110a on which the signal arrives and a monitoring port.

Using table access facility 212, the operator inserts in trigger table 216 of switching node 110a triggers for detecting initiation of any signal associated with the target telephone number (step 520). For example, the operator may insert in trigger table 216 of a trigger A2, which includes a key field and an action field. The key field includes the target telephone number. The action field includes instructions for detecting initiation of any signal associated with the target telephone number, associating the detected signal with a call treatment tag, for example tag "42," and including tag 42 in an SS7 initial address message (IAM), which SSP 250 sends to STP 150.

The IAM message may include, for example, the target telephone number, the called telephone number, date, time, the port number on which the detected signal enters switching node 110a, an identifier associated with switching node 110a, and a flag field that includes tag 42. For example, the IAM message may be an ISDN User Part (ISUP) message, which includes the IAM message information in the form of octets in the signaling information field (SIF) of a message signal unit (MSU) structure.

The operator inserts in trigger table 416 of STP 150 trigger C2 for routing a detected signal through the route, which is provisioned in step 510, to the monitoring port (step 530). The key field in trigger C2 includes tag 42. The action field in trigger C2 includes instructions for routing at switching node 110a any signal associated with the target telephone number on the provisioned virtual loopback route. Finally, the operator activates the triggers A2 and C2 in trigger tables 216 and 416, respectively (step 540).

In one embodiment, telephone 101, which is assigned to the target telephone number identified in step 500, initiates a signal to a telephone number assigned to, for example, telephone 106 shown in FIG. 8. As shown in the flow chart of FIG. 6, when switching node 110a detects the signal, operating system 214 identifies the target telephone number associated with the signal (step 600). Operating system 214 uses the target telephone number as a key into trigger table 216 to retrieve and execute trigger A2. Trigger A2 suspends call processing associated with target telephone number, and inserts tag 42 in the flag field of an IAM message, which SSP 250 sends to STP 150 (step 610).

When STP 150 receives the IAM message from switching node 110a, operating system 414 uses tag 42 as a key into trigger table 416 to retrieve and execute trigger C2, which routes the detected signal through the virtual loopback route to the monitoring port in switching node 110a (steps 620–630). The monitoring port may be connected to a speaker, a video display, or digital data capturing device, each of which provides the capability to hear or view the contents of the signal.

When the signal passes through the monitoring port, normal call routing resumes (step 650), and STP 150 routes the signal from switching node 110a to switching node 110c, which then directs the signal to telephone 106. Accordingly, when the signal terminates, switching node 110a, 110c, and STP 150 perform normal call termination steps. Finally, when monitoring of the target telephone number is completed, the operator de-activates triggers A2 and C2 (step 660). In addition, the operator may delete triggers A2 and C2 from trigger tables 216 and 416, respectively.

It will be understood by those skilled in the art that various changes and modifications may be made to the disclosed implementations, and equivalents may be substituted for elements thereof without departing from the true scope of the invention. In addition, many modifications may be made to adapt a particular element, technique or implementation to the teachings of the present invention without departing from the central scope of the invention. Therefore, it is intended that this invention not be limited to the particular implementations and methods disclosed herein, but that the invention include all implementations falling within the scope of the appended claims.

What is claimed is:

1. A method for configuring a system for monitoring a signal associated with a telephone number in a network, said method comprising the steps of:

provisioning a route to a collection node in the network;

defining, in a first node, a first trigger for intercepting the signal; and defining, in a signaling node, a second trigger for routing the intercepted signal on the provisioned route to the collection node.

2. The method of claim 1, wherein said step of defining the first trigger comprises the step of:

inserting, by the first trigger, a call treatment tag within an ISDN user part message.

3. The method of claim 2, wherein said step of defining the second trigger comprises the step of:

keying the second trigger off the call treatment tag inserted by the first trigger.

4. A method for configuring a system for monitoring a signal associated with a telephone number in a network, said method comprising the steps of:

provisioning a route between a first node and a collection node in the network;

defining, in the first node, a first trigger for detecting the signal; and defining, in a signaling node, a second trigger for routing the detected signal on the provisioned route to the collection node.

5. The method of claim 4 further comprising the step of:

activating the first trigger and the second trigger before monitoring the signal.

6. The method of claim 4 further comprising the steps of:

de-activating the first trigger and the second trigger after monitoring the signal; and removing the first trigger and the second trigger from the first node and the signal transfer node, respectively.

7. The method of claim 4, wherein said step of defining the first trigger comprises the step of:

associating, at the first node, a first call treatment tag with the telephone number.

8. The method of claim 7, wherein said step of defining the second trigger comprises the step of:

defining, at the signaling node, routing instructions associated with the first call treatment tag.

9. The method of claim 4, wherein said step of defining the first trigger comprises the step of:

inserting, by the first trigger, a call treatment tag within an ISDN user part message.

10. The method of claim 9, wherein said step of defining the second trigger comprises the step of:

keying the second trigger off the call treatment tag inserted by the first trigger.

11. The method of claim 4, wherein said step of defining the first trigger comprises the steps of:

inserting, by the first trigger, a call treatment tag within an ISDN user part message; and associating the call treatment tag with the telephone number.

12. A method for monitoring a signal associated with a telephone number in a network including a provisioned route between a first node and a collection node, said method comprising the steps of:

detecting the signal at the first node based on a predefined trigger;

routing, at a signaling node, the detected signal on the provisioned route to the collection node; and monitoring the routed signal at the collection node.

13. The method of claim 12, wherein said detecting step comprises the step of:

detecting modifications in service features associated with the telephone number based on a predefined trigger.

14. The method of claim 12, wherein said detecting step comprises the step of:
   detecting modifications in status of the signal based on a predefined trigger.

15. The method of claim 12, wherein said detecting step comprises the step of:
   associating, at the first node, a first call treatment tag with the signal.

16. The method of claim 12, wherein said routing step comprises the step of:
   routing the detected signal on the provisioned route based on a predefined trigger.

17. The method of claim 15, wherein said routing step comprises the step of:
   routing the detected signal on the provisioned route based on a predefined trigger corresponding to the first call treatment tag.

18. The method of claim 12, wherein said detecting step comprises the steps of:
   detecting the signal at the first node based on a trigger, the trigger inserting a call treatment tag within an ISDN user part message.

19. The method of claim 12, wherein said detecting step comprises the steps of:
   detecting the signal at the first node based on a trigger, the trigger inserting a call treatment tag within an ISDN user part message; and
   associating the call treatment tag with the telephone number.

20. A method for configuring a system for monitoring a signal associated with a telephone number in a network, said method comprising the steps of:
   provisioning a first route between a first node and a second node in the network;
   provisioning a second route between the second node and a collection node in the network;
   defining, in the first node and the second node, a first set of triggers for detecting the signal; and
   defining, in a signaling node, a second set of triggers for routing the detected signal on the first and the second provisioned routes to the collection node.

21. The method of claim 20 further comprising the step of:
   activating the first and the second set of triggers before monitoring the signal.

22. The method of claim 20 further comprising the steps of:
   de-activating the first and the second set of triggers after monitoring the signal; and
   removing the first and the second set of triggers from the first node, the second node, and the signaling node, respectively.

23. The method of claim 20, wherein said step of defining the first set of triggers comprises the step of:
   associating, at the first node, a first call treatment tag with the telephone number.

24. The method of claim 23, wherein said step of defining the first set of triggers further comprises the step of:
   associating, at the second node, a second call treatment tag with the telephone number.

25. The method of claim 24, wherein said step of defining the second set of triggers comprises the step of:
   defining, at the signaling node, routing instructions associated with the first and the second call treatment tags, respectively.

26. The method of claim 20, wherein said step of defining the first set of triggers comprises the step of:
   inserting, by the first set of triggers, at least one call treatment tag within at least one ISDN user part message.

27. The method of claim 26, wherein said step of defining the second set of triggers comprises the step of:
   keying the second set of triggers off the at least one call treatment tag inserted by the first set of triggers.

28. The method of claim 20, wherein said step of defining the first set of triggers comprises the steps of:
   inserting, by the first set of triggers, at least one call treatment tag within at least one ISDN user part message; and
   associating the at least one call treatment tag with the telephone number.

29. A method for monitoring a signal associated with a telephone number in a network including a first provisioned route between a first node and a second node and a second provisioned route between the second node and a collection node, said method comprising the steps of:
   detecting the signal at the first and the second nodes based on predefined triggers, respectively;
   routing, at a signaling node, the detected signal on the first and the second provisioned routes to the collection node; and
   monitoring the routed signal at the collection node.

30. The method of claim 29, wherein said detecting step comprises the step of:
   detecting modifications in service features associated with the telephone number based on predefined triggers.

31. The method of claim 29, wherein said detecting step comprises the step of:
   detecting modifications in status of the signal based on predefined triggers.

32. The method of claim 29, wherein said detecting step comprises the step of:
   associating, at the first node, a first call treatment tag with the signal.

33. The method of claim 29, wherein said detecting step comprises the step of:
   associating, at the second node, a second call treatment tag with the signal.

34. The method of claim 29, wherein said routing step comprises the step of:
   routing the detected signal on the first and the second provisioned routes based on predefined triggers, respectively.

35. The method of claim 32, wherein said routing step comprises the step of:
   routing the detected signal on the first provisioned route based on a predefined trigger corresponding to the first call treatment tag.

36. The method of claim 33, wherein said routing step comprises the step of:
   routing the detected signal on the second provisioned route based on a predefined trigger corresponding to the second call treatment tag.

37. The method of claim 29, wherein said detecting step comprises the step of:
   detecting the signal at the first and second nodes based on at least one trigger, the at least one trigger inserting a call treatment tag within an ISDN user part message.

38. The method of claim 29, wherein said detecting step comprises the steps of:

detecting the signal at the first and second nodes based on at least one trigger, the at least one trigger inserting a call treatment tag within an ISDN user part message; and associating the call treatment tag with the telephone number.

39. A method for configuring a system for monitoring a signal associated with a telephone number in a network, said method comprising the steps of:

provisioning a virtual loopback route between a first port and a second port in a first node in the network;

defining, in the first node, a first trigger for detecting the signal; and defining, in a signaling node, a second trigger for routing the detected signal on the provisioned virtual loopback route to the second port.

40. The method of claim 39 further comprising the step of:

activating the first trigger and the second trigger before monitoring the signal.

41. The method of claim 39 further comprising the steps of:

de-activating the first trigger and the second trigger after monitoring the signal; and removing the first trigger and the second trigger from the first node and the signal transfer node.

42. The method of claim 39, wherein said step of defining the first trigger comprises the step of:

associating, at the first node, a first call treatment tag with the telephone number.

43. The method of claim 42, wherein said step of defining the second trigger comprises the step of:

defining, at the signaling node, routing instructions associated with the first call treatment tag.

44. The method of claim 39, wherein said step of defining the first trigger comprises the step of:

inserting, by the first trigger, a call treatment tag within an ISDN user part message.

45. The method of claim 44, wherein the step of defining the second trigger comprises the step of:

keying the second trigger off the call treatment tag inserted by the first trigger.

46. The method of claim 39, wherein said step of defining the first trigger comprises the steps of:

inserting, by the first trigger, a call treatment tag within an ISDN user part message; and associating the call treatment tag with the telephone number.

47. A method for monitoring a signal associated with a telephone number in a network, said method comprising the steps of:

detecting the signal at a first node that includes a provisioned virtual loopback route between a first port and a second port based on a predefined trigger;

routing, at a signaling node, the detected signal on the provisioned virtual loopback route to the second port; and monitoring the routed signal at the second port.

48. The method of claim 47, wherein said detecting step comprises the step of:

detecting modifications in service features associated with the telephone number based on a predefined trigger.

49. The method of claim 47, wherein said detecting step comprises the step of:

detecting modifications in status of the signal based on a predefined trigger.

50. The method of claim 47, wherein said routing step comprises the step of:

routing the detected signal on the provisioned virtual loopback route based on a predefined trigger.

51. The method of claim 47, wherein said detecting step comprises the step of:

associating, at the first node, a first call treatment tag with the signal.

52. The method of claim 47, wherein said routing step comprises the step of:

routing the detected signal on the provisioned virtual loopback route based on a predefined trigger corresponding to the first call treatment tag.

53. The method of claim 47, wherein said detecting step comprises the step of:

detecting the signal at the first nodes based on a trigger, the trigger inserting a call treatment tag within an ISDN user part message.

54. The method of claim 35, wherein said detecting step comprises the steps of:

detecting the signal at the first nodes based on a trigger, the trigger inserting a call treatment tag within an ISDN user part message; and associating the call treatment tag with the telephone number.

55. A system for monitoring a signal associated with a telephone number in a network, said system comprising:

a first node that includes a first trigger for detecting the signal;

a second node that includes a second trigger for detecting the signal;

a first provisioned route connecting the first node to the second node;

a second provisioned route connecting the second node to a collection node; and a signaling node that includes a third and a fourth trigger for routing the detected signal on the first and the second provisioned routes, respectively, to the collection node such that the routed signal is monitored at the collection node.

56. The system of claim 55 further comprising:

a first call treatment tag inserted by said first trigger into a first ISDN user part message; and a second call treatment tag inserted by said second trigger into a second ISDN user part message;

wherein said third and fourth triggers are keyed off said first and second call treatment tags respectively.

57. A system for monitoring a signal associated with a telephone number in a network, said system comprising:

a first node that includes a first trigger for detecting the signal;

a first provisioned route connecting the first node to a collection node; and a signaling node that includes a second trigger for routing the detected signal on the first provisioned route to the collection node such that the routed signal is monitored at the collection node.

58. The system of claim 57 further comprising a call treatment tag inserted by said first trigger within an ISDN user part message, wherein said second trigger is keyed off said call treatment tag.

59. A system for monitoring a signal associated with a telephone number in a network, said system comprising:

a first node including a first port;

a second port;

a provisioned virtual loopback route linking the first port to the second port; and a first trigger for detecting the signal; and a signaling node that includes a second trigger for routing the detected signal on the provisioned virtual loopback route to the second port such that the routed signal is monitored at the second port.

60. The system of claim 59 further comprising a call treatment tag inserted by said first trigger within an ISDN user part message, wherein said second trigger is keyed of said call treatment tag.

61. A method for configuring a system for monitoring a signal associated with a telephone number in a network, said method comprising the steps of:

provisioning a route to a collection node in the network;

defining, in a first node, a first trigger for intercepting the signal, the first trigger inserting a call treatment tag within an ISDN user part message; and defining, in a signaling node, a second trigger that is keyed off the call treatment tag inserted by the first trigger, the second trigger routing the intercepted signal on the provisioned route to the collection node.

\* \* \* \* \*